(12) United States Patent
Myatt et al.

(10) Patent No.: US 8,285,131 B1
(45) Date of Patent: Oct. 9, 2012

(54) APPARATUS AND METHOD FOR RECORDING AN IMAGE ON PHOTOGRAPHIC FILM

(75) Inventors: Gregory A. Myatt, Livermore, CA (US); Alexander P. Payne, Ben Lomond, CA (US); Jahja I. Trisnadi, Cupertino, CA (US); Harold A. Zarem, Palo Alto, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 0 days.

(21) Appl. No.: 12/949,618

(22) Filed: Nov. 18, 2010

Related U.S. Application Data

(60) Provisional application No. 61/281,462, filed on Nov. 18, 2009.

(51) Int. Cl.
*G03B 37/02* (2006.01)
(52) U.S. Cl. .......................................... 396/20
(58) Field of Classification Search ............... 396/20; 347/239, 255; 355/65, 66
See application file for complete search history.

(56) References Cited

U.S. PATENT DOCUMENTS

| | | | | |
|---|---|---|---|---|
| 5,311,360 A * | 5/1994 | Bloom et al. | ................. | 359/572 |
| 5,870,176 A * | 2/1999 | Sweatt et al. | ................... | 355/53 |
| 6,480,259 B1 | 11/2002 | Wong et al. | | |
| 7,248,278 B1 * | 7/2007 | Carlisle et al. | ............... | 347/239 |
| 2002/0180944 A1 * | 12/2002 | Fujii et al. | ........................ | 355/70 |
| 2003/0038930 A1 * | 2/2003 | Sumii | ............................. | 355/47 |
| 2005/0068609 A1 * | 3/2005 | Trisnadi et al. | ............... | 359/291 |

\* cited by examiner

*Primary Examiner* — Rodney Fuller
(74) *Attorney, Agent, or Firm* — William E. Nuttle

(57) ABSTRACT

A film recorder including a linear diffractive spatial light modulator (LDSLM) and methods of using the same to record a digital image on a strip of photographic film are provided. In one embodiment, the recorder includes: an illuminator including at least one monochromatic light source generating a light beam; a spatial light modulator assembly including at least one linear diffractive spatial light modulator (LDSLM) to receive the light beam from the illuminator and modulate the light beam from the illuminator; a film transport for transporting a photographic film on an imaging plane; and imaging optics disposed in a light path between the LDSLM and the imaging plane to image the light beam simultaneously on a substantially linear portion of the photographic film to record an image on the photographic film. Other embodiments are also provided.

15 Claims, 11 Drawing Sheets

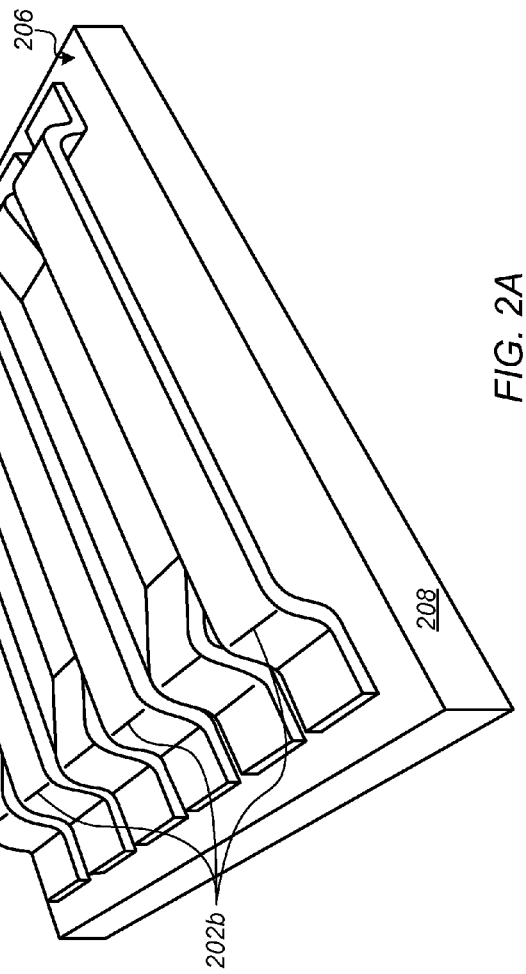
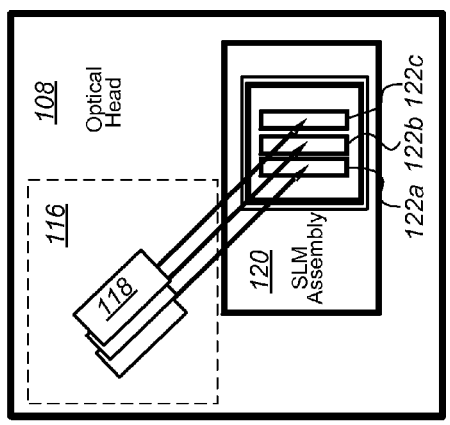
FIG. 2A
FIG. 1B

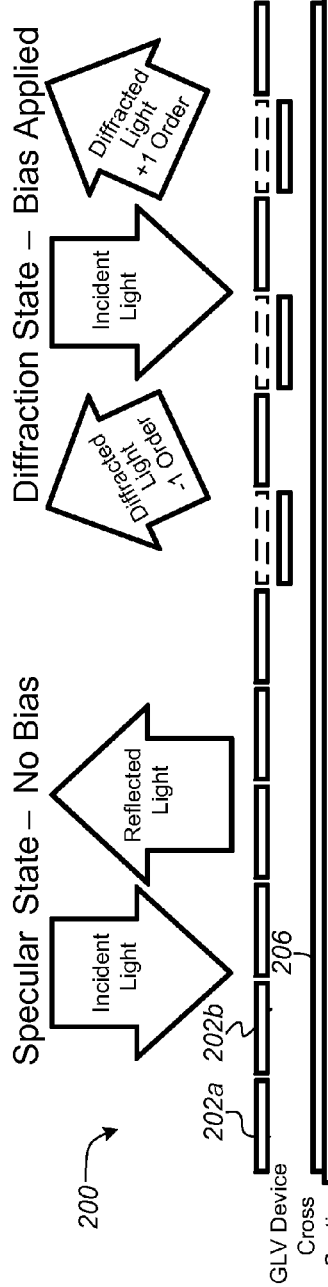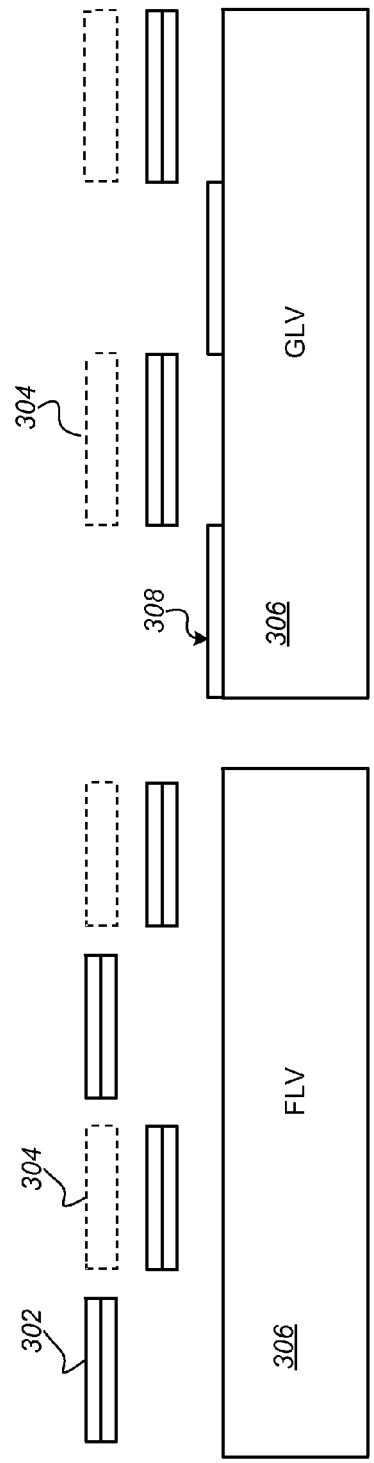

APPARATUS AND METHOD FOR RECORDING AN IMAGE ON PHOTOGRAPHIC FILM

CROSS-REFERENCE TO RELATED APPLICATIONS

The present application claims the benefit of priority under 35 U.S.C. 119(e) to U.S. Provisional Patent Application Ser. No. 61/281,462, entitled "Apparatus And Method For Recording A Digital Image On Photographic Film," filed Nov. 18, 2009, which application is hereby incorporated by reference in its entirety.

TECHNICAL FIELD

The present invention relates to film recorders and, in particular, to film recorders including a diffractive spatial light modulator and methods of using the same to record a digital image on a strip of photographic film.

BACKGROUND

Film Recorders are output devices used for transferring video (moving) and/or still digital images to photographic film for archival storage or display. Generally, a film recorder includes a light tight enclosure in which the photographic film is moved across an imaging plane at a predetermined speed, a processor to read the digital image and control a modulator to modulate light from a light source, and imaging optics to focus the modulated light on the imaging plane to record the image on the film. Generally, the light is modulated using a Cathode Ray Tube (CRT) which exposes the film a pixel at a time by scanning an electron beam of variable intensity along a phosphorescent screen, or by scanning a spot beam of modulated monochromatic light across the film to incrementally expose pixels in a raster type scan. Typically the beam is scanned across a width of the film, which is then moved in incremental steps after each line is scanned until the frame has been exposed. The film is stable during exposure and is advanced to the next frame after the frame has been completely exposed. Alternatively, the film can be advanced at constant velocity while the exposure is being done. Conventional film recorders suffer from a number of problems. First, the frame rate or speed at which the film can be exposed and advanced is slow, typically on the order of 0.5 to 2 frames per second. Exposing film a single pixel at a time is a limiting factor in frame rate. Second, a resolution of the image is low, typically on the order of 2 k to 4 k of pixels per line or width of the film. Finally, in CRT illumination systems, recording of color images using a monochromatic light source requires repetitive exposures of each frame using filters to expose each color, further reducing the frame rate. On the other hand, in the existing laser system, three projection optical paths are required to place three colors on the film.

SUMMARY

A film recorder including a linear diffractive spatial light modulator (LDSLM) and methods of using the same to record a digital image on a strip of photographic film are provided. In one embodiment, the recorder includes: an illuminator including at least one monochromatic light source generating a light beam; a spatial light modulator assembly including at least one linear diffractive spatial light modulator (LDSLM) to receive the light beam from the illuminator and modulate the light beam from the illuminator; a film transport for transporting a photographic film on an imaging plane; and imaging optics disposed in a light path between the LDSLM and the imaging plane to image the light beam simultaneously on a substantially linear portion of the photographic film to record an image on the photographic film. Other embodiments are also provided. Generally, the LDSLM comprises a linear array of a plurality of deformable ribbons each having a light reflective planar surface, the plurality of deformable ribbons grouped to form a number of pixels. In certain embodiments, the illuminator includes a plurality of monochromatic light sources, each of a different color, which are independently controlled to record a color image on the photographic film either frame-by-frame or line-by-line.

BRIEF DESCRIPTION OF THE DRAWINGS

These and various other features of the invention will be apparent upon reading of the following detailed description in conjunction with the accompanying drawings and the appended claims provided below, where:

FIG. 1B is a partial schematic block diagram of an optical head of a film recorder including a plurality of LDSLMs according to another embodiment of the present disclosure;

FIG. 2A is a perspective view of a pixel or sub-pixel of an LDSLM according to an embodiment of the present disclosure;

FIGS. 2B and 2C are schematic cross-sectional views of a pixel of the LDSLM of FIG. 2A in a specular state and a diffraction state according to an embodiment of the present disclosure;

FIG. 3A is a schematic cross-sectional view of a portion or pixel of an LDSLM having interlaced active and static ribbons according to an embodiment of the present disclosure;

FIG. 3B is a schematic cross-sectional view of a portion or pixel of an LDSLM having space apart static ribbons over a reflective substrate according to another embodiment of the present disclosure;

DETAILED DESCRIPTION

The present disclosure is directed to a film recorder including a diffractive spatial light modulator and methods of using the same to record a digital image on a strip of photographic film.

Figure 1A:
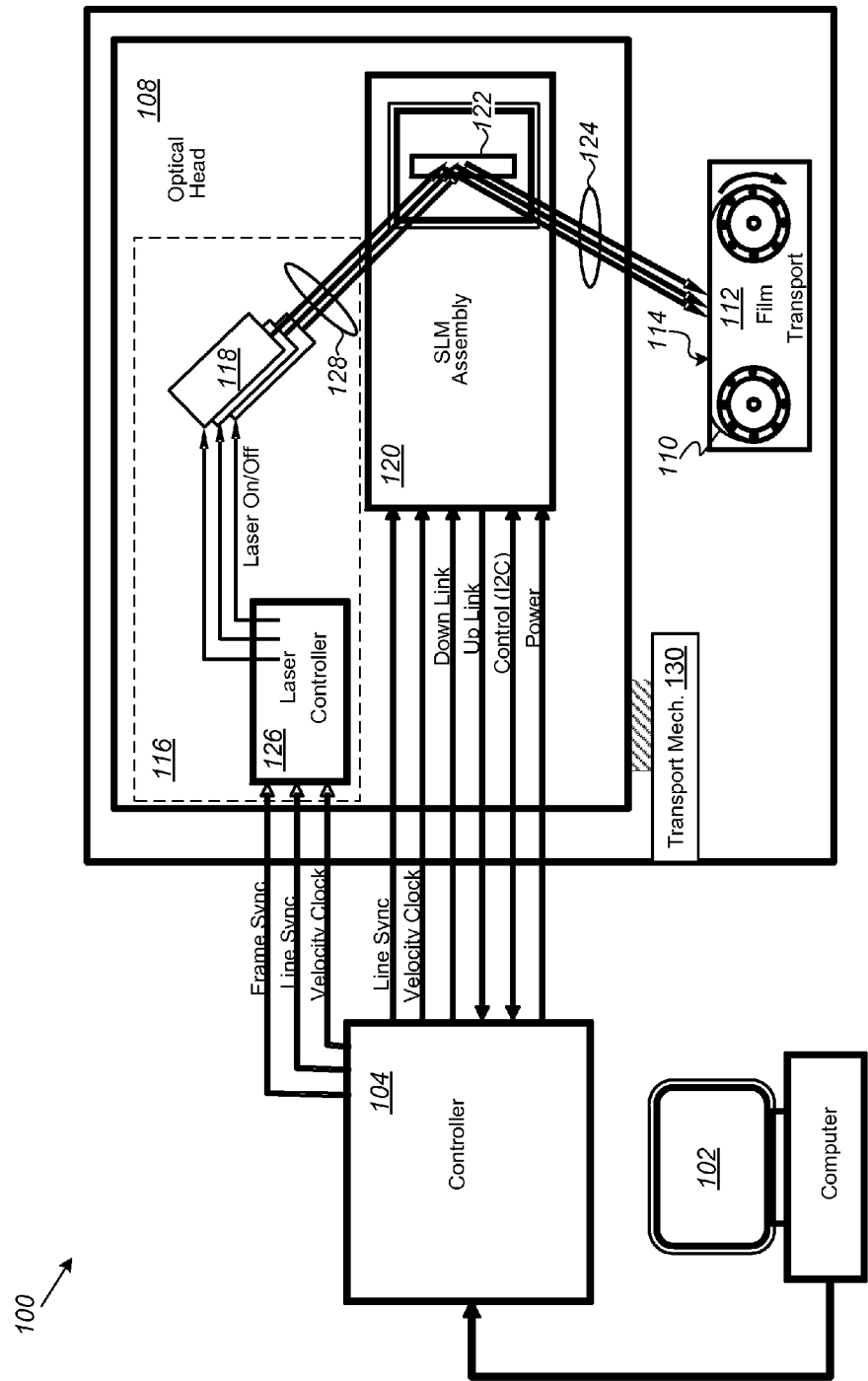
FIG. 1A is a schematic block diagram of a film recorder including a linear diffractive spatial light modulator (LDSLM) according to an embodiment of the present disclosure.

A film recorder 100 according to an embodiment of the present invention is shown in FIG. 1A. Referring to FIG. 1A digital images captured by a still or video camera are stored in a computer 102 or in the camera (not shown) electrically coupled to a controller 104 in the film recorder 100. The film recorder further includes a light tight enclosure 106 enclosing an optical head 108 for generating a modulated beam of light for exposing a plate or strip of photographic film 110, and a film transport 112 for moving the photographic film across an imaging plane 114 line-by-line or frame-by-frame at predetermined speed. The optical head 108 includes an illuminator 116 having at least one light source 118, such as an LED or a laser, to generate a light beam, a spatial light modulator (SLM) assembly or module 120 including at least one linear diffractive spatial light modulator (LDSLM 122) to receive and spatially modulate the light beam from the illuminator, and imaging optics 124 disposed in a light path between the LDSLM and the imaging plane 114 to image the light beam simultaneously on a substantially linear portion of the photographic film 110. Generally, as in the embodiment shown, the illuminator 116 further includes a light source or laser controller 126 to control power to the light source 118, and illumination optics 128. The laser controller 126 controls power to the light source 118 in response to signals from the controller 104 synchronize the light beam with line and/or frame speed of the film. The illumination optics 128 can comprise a number of elements including lens integrators, mirrors and prisms, designed to transfer light from the light source 118 to the LDSLM 122 such that a line of a specified size is illuminated at the LDSLM. In particular, the illumination optics 128 is adapted to illuminate a swath covering substantially the full width of the LDSLM 122.

Optionally, as in the embodiment shown, the spatial light modulator module 120 further includes a transport mechanism 130 to move, rotate or reposition the optical head 108 relative to the imaging plane 114 to move the light beam imaged on substantially linear portion of the photographic film to record a plurality of linear portions or a full frame of the image on the photographic film without moving the film. In alternative embodiment (not shown), the imaging optics 124 can further include a mirror in the light path between the LDSLM 122 and the imaging plane 114 and a mirror positioning mechanism to move, rotate or reposition the mirror to sequentially move the light imaged on substantially linear portion of the photographic film to record a plurality of linear portions or a full frame of the image on the photographic film without moving the film.

In another embodiment, shown in FIG. 1B, the optical head 108 of the film recorder can include an illuminator 116 including a plurality of monochromatic light sources (collectively 118), each producing a different color or wavelength, and an SLM assembly 120 including a plurality of LDSLMs 122a-122c. Each LDSLMs 122a-122c can be configured to receive the light beam from a different one of the plurality of monochromatic light sources and modulate the light beam. Imaging optics (not shown in this figure) can be configured to image the modulated light beams from each of the plurality of LDSLMs 122a-122c simultaneously on a substantially linear portion of the photographic film to record an image on the photographic film. Alternatively, the imaging optics can be configured to produce a plurality of substantially linear portions on the photographic film, one from each LDSLMs 122a-122c off-set or separated on the film by one or more beam widths or pixels.

One type of LDSLM is a ribbon-type spatial light modulator, such as a Grating Light Valve (GLV™) or FLV™ commercially available from Silicon Light Machines, Inc., of Sunnyvale, Calif.

A perspective view of a pixel or sub-pixel of an LDSLM according to an embodiment of the present disclosure is shown in FIG. 2A. Referring to FIG. 2A, a ribbon-type spatial light modulator 200 generally includes a number of ribbons 202a, 202b, each having a light reflective surface 204 supported over a surface 206 of a substrate 208. One or more of the ribbons 202a are deflectable toward the substrate 208 to form an addressable diffraction grating with adjustable diffraction strength. The ribbons are 202a deflected towards base electrodes (not shown in this figure) formed in or on the substrate 208 by electrostatic forces when a voltage is applied between the deflectable ribbons 202a and the base electrodes. The applied voltages controlled by drive electronics (not shown in this figure), which may be integrally formed in or on the surface 206 of the substrate 208 below or adjacent to the ribbons 202. Light reflected from the movable ribbons 202a adds as vectors of magnitude and phase with that reflected from stationary ribbons 202b or a reflective portion of the surface 206 beneath the ribbons, thereby modulating light reflected from the LDSLM 200 from fully reflected to fully diffracted or extinguished. By fully reflected it is meant the reflected component is the same as the diffracted 0th-order component. So the light is fully reflected if all the incoming light is diffracted into the 0th-order only, and fully diffracted if diffracted if it is diffracted to 1st, 2nd, or 3rd, but not the 0th-order (i.e. vanishing 0th-order).

Schematic cross-sectional views of a pixel of the LDSLM 200 of FIG. 2A in a non-diffracting or specular state and a diffraction states are shown in FIGS. 2B and 2C respectively.

As noted above, suitable LDSLM include a GLV™ and a FLV™ Referring to FIG. 3A, an FLV™ or Fixed-ribbon GLV™ 300 includes a number of interlaced fixed and movable ribbons, 302 and 304 respectively, each having a reflective surface on a top surface thereof, and positioned over a substrate 306. The movable ribbons 304 are electrostatically deflected by an odd multiple of a ¼ wavelength of the incident light to cause light reflected therefrom to destructively interfere with light from the fixed ribbons 302. The strength or magnitude of the modulated light can be varied to any degree from fully reflected to fully diffracted or extinguished. Although FLVs™ typically have a Fill-factor (reflecting efficiency) of less than 100%, the reflecting state is the same for all wavelengths, without tuning or matching the ribbon structure and deflection to the incident light making it particularly suitable for use in film recorders. In one exemplary embodiment, the FLV™ LDSLM ribbon structure includes 8192 active and 8192 bias ribbons, with 2 diffractors (ribbons) per pixel, and a ribbon width of about 1.875 µm and gaps between ribbons of about 0.625 µm.

Referring to FIG. 3B, in another embodiment the LDSLM can include a true GLV™ 300 having a number of spaced apart movable ribbons 304 positioned over a substrate 306 having a reflective surface on a top surface 308. True-GLVs have a higher efficiency (Fill-factor is 100%) are well suited for high pixel count single-wavelength light modulation. However, the dimensions of the ribbons, the gaps and the deflection are generally tuned per wavelength, and thus a particular LDSLM is preferably used to modulate light from a single, monochromatic light source. Thus, this type of LDLSM is particular suitable for monochromatic applications or in embodiments including multiple LDSLMs, each adapted or configured to receive a different light wavelength.

Figure 4:
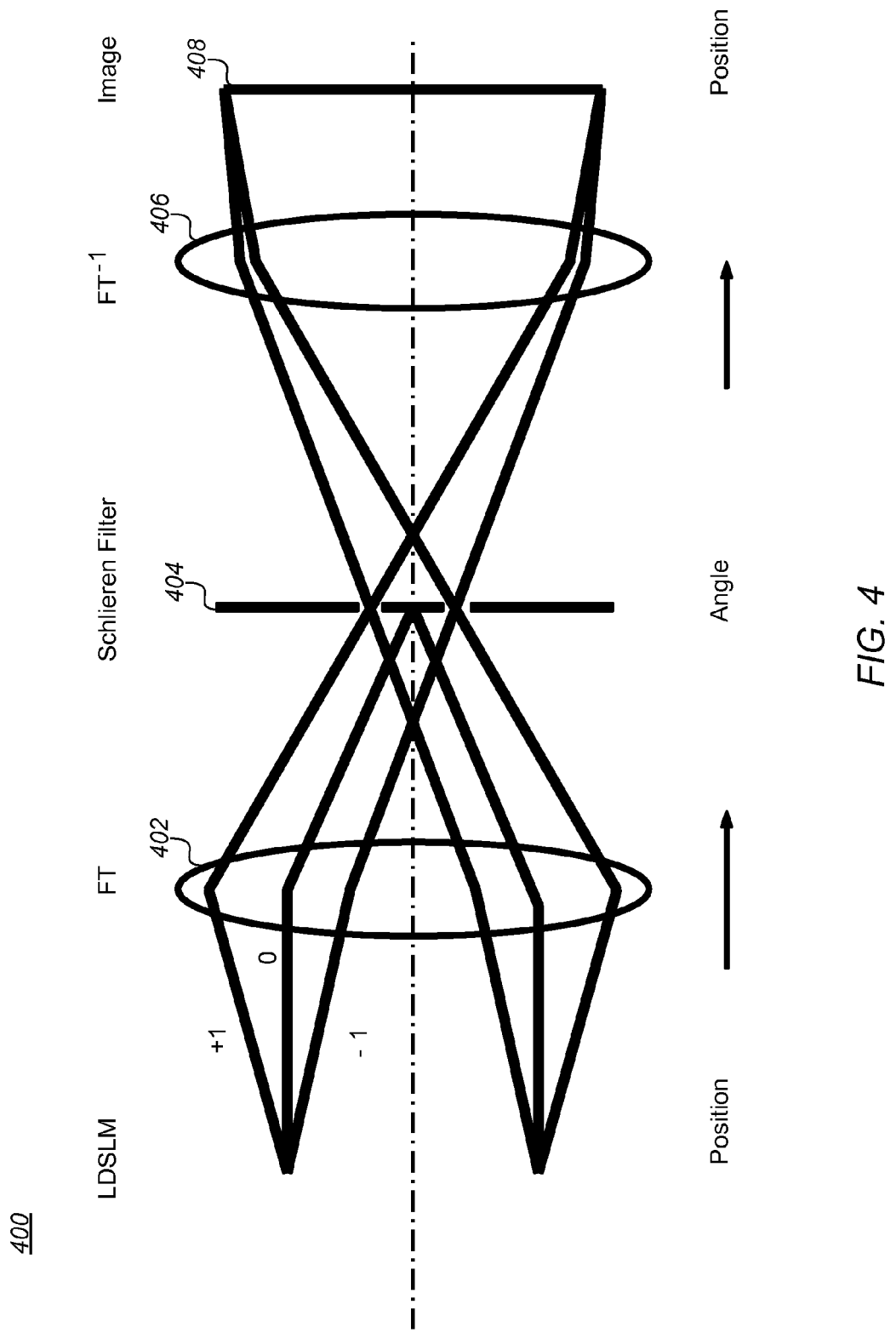
FIG. 4 is an optics diagram illustrating a contrast mechanism for an LDSLM according to an embodiment of the present disclosure.

FIG. 4 is an optics diagram illustrating a contrast mechanism for an LDSLM according to an embodiment of the present disclosure. Referring to FIG. 4, the mechanism 400, which is part of or incorporated into the imaging optics of the film recorder, includes Fourier transform lens 402, Fourier transform or Schlieren filter 404, and inverse Fourier transform lens 406 to direct an image from the LDSLM (not shown in this figure) onto an imaging plane 408. The FT lens 402 magnifies and focuses light from the LDSLM onto the filter 404. The filter 404 selects a predetermined order of light and transforms angular intensity modulation of the light into image contrast. Inverse Fourier transform lens 406 ($FT^{-1}$) transmits and focuses light from the filter 404 onto the imaging plane 408.

Figure 5:
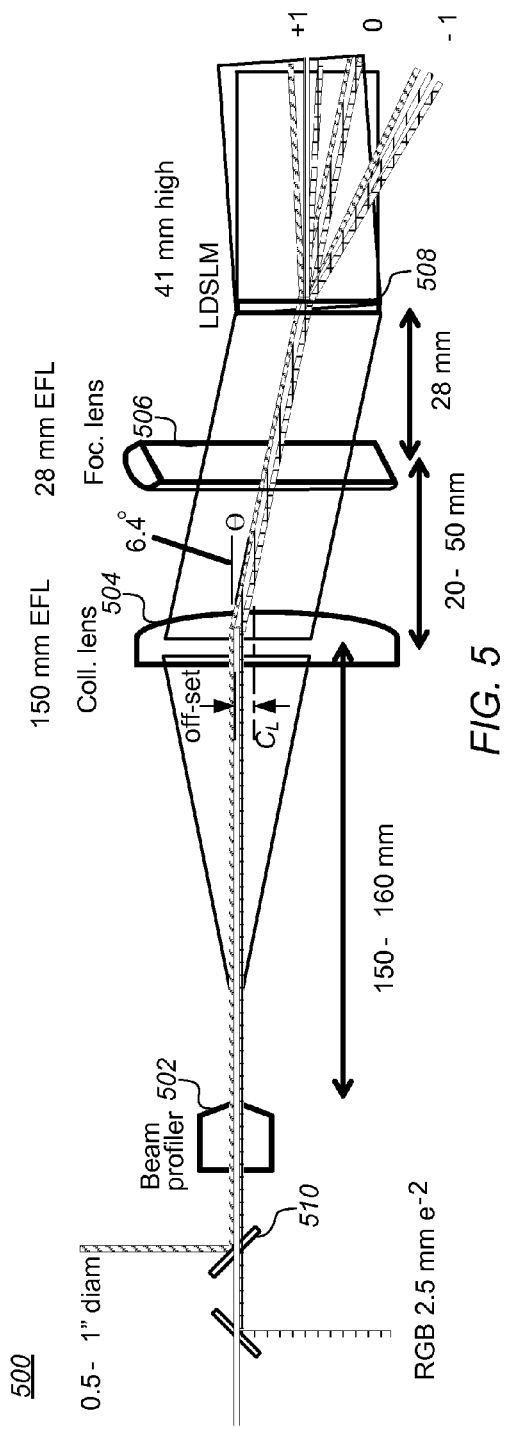
FIG. 5 is an optics diagram of illumination optics for a film recorder including an LDSLM according to an embodiment of the present disclosure.

FIG. 5 is an optics diagram of illumination optics for a film recorder including an LDSLM according to an embodiment of the present disclosure. Referring to FIG. 5, the illumination optics 500 includes a beam profiler 502 to shape or expand light from the light source to substantially fill a LDSLM 508, a collimating lens 504 to collimate and redirect light from the beam profiler to the LDSLM, and a focus lens 506 to focus light from the collimating lens onto the LDSLM. Optionally or preferably, where the light source includes a plurality of different monochromatic light sources, each having a different wavelength or color to record color images, the illumination optics 500 further includes a number of combiners 510 before the beam profiler 502 to combine or unite light from the discrete light sources prior to focusing on the LDSLM 508.

In one preferred embodiment, shown in FIG. 5, the input beam from the beam profiler 502 enters the collimating lens 504 off-axis, that is displaced relative to lens center. This imparts a specific angle ($\Theta$), shown here as 6.4°, to the illumination beam exiting the collimating lens 504. By arranging or choosing this angle is to match the GLV diffraction angle, i.e., the angle by which the LDSLM 508 separates the orders of light, the diffracted 1st order light exits the LDSLM normally, i.e. along the optical axis as shown, enabling the optical system to be much more compact.

Figure 6:
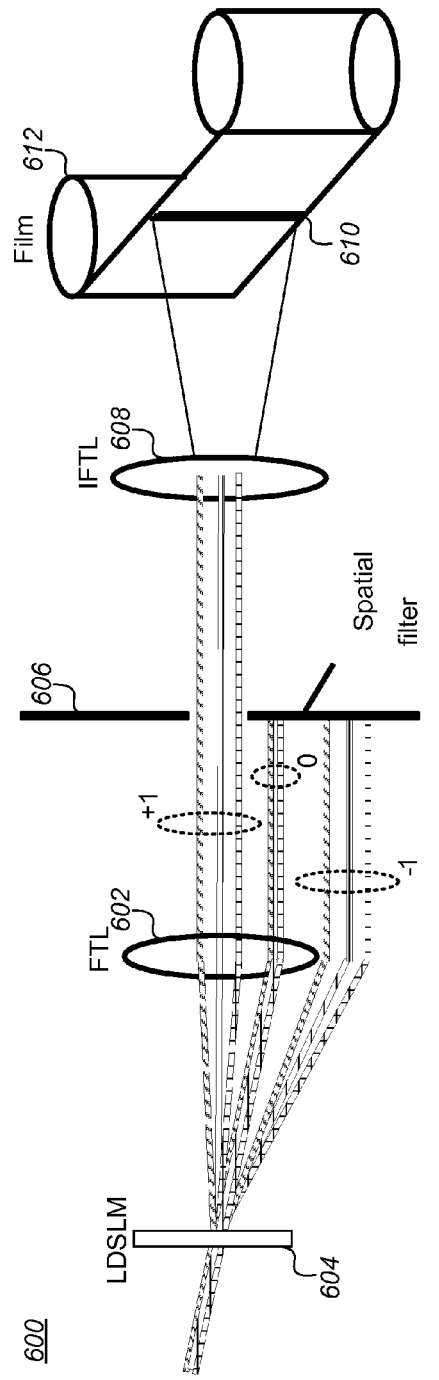
FIG. 6 is an optics diagram of imaging optics for a film recorder including an LDSLM according to an embodiment of the present disclosure.

FIG. 6 is an optics diagram of imaging optics for a film recorder including an LDSLM according to an embodiment of the present disclosure. Referring to FIG. 6, as noted above with respect to the contrast mechanism for a GLV, the imaging optics 600 includes a FT lens 602 to magnify and focus light from an LDSLM 604 onto a spatial filter 606 that selects a predetermined order of light and transforms angular intensity modulation of the light into image contrast, and an inverse Fourier transform lens 608 ($FT^{-1}$) that transmits and focuses light from the filter 606 onto the imaging plane 610 of a photographic film 612.

Figure 7:
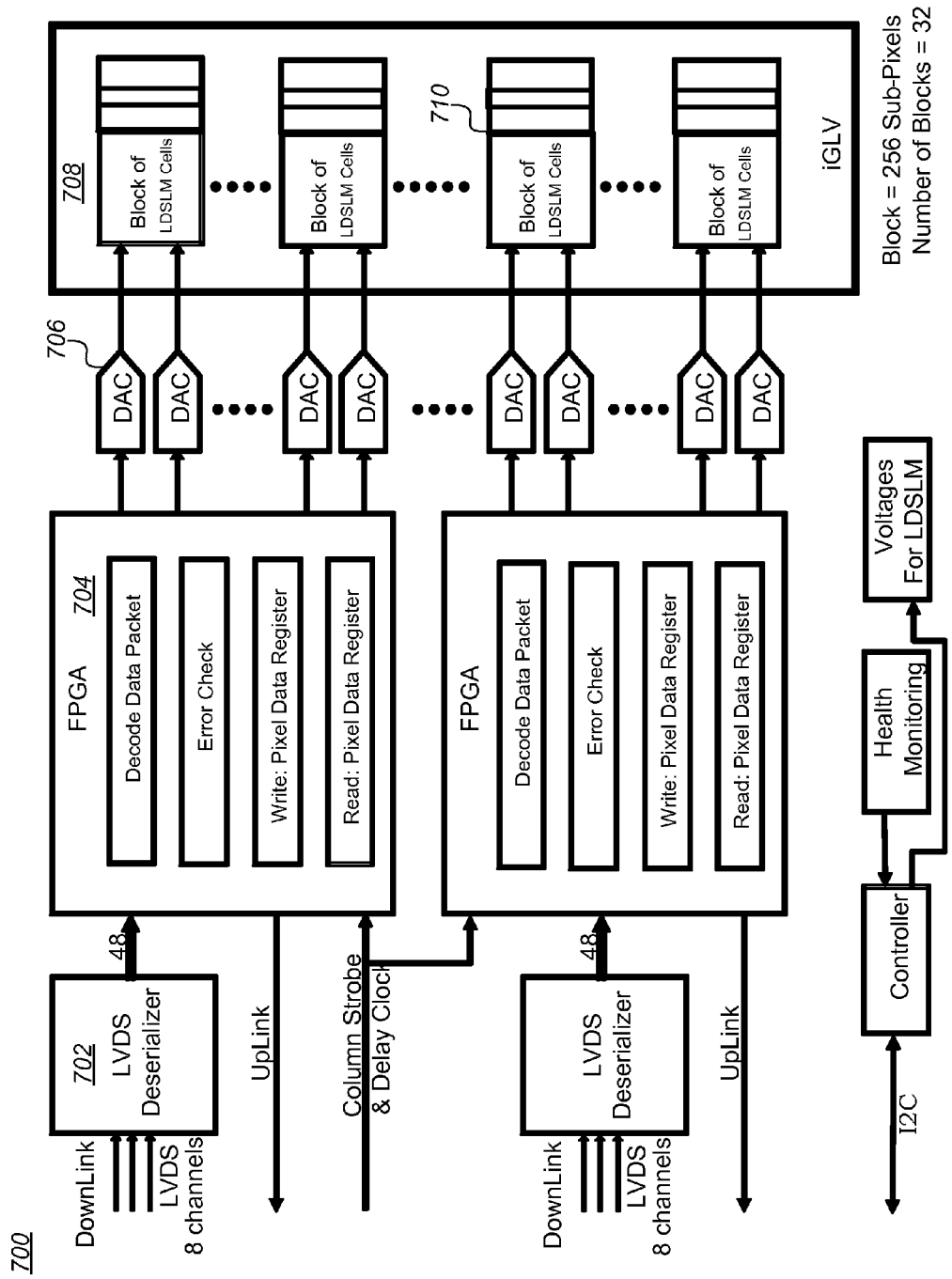
FIG. 7 is a schematic block diagram of a spatial light modulator module architecture for a film recorder according to an embodiment of the present disclosure.

FIG. 7 is a schematic block diagram of a spatial light modulator module architecture for a film recorder according to an embodiment of the present disclosure. Referring to FIG. 7, the module 700 includes a number of LVDS (Low-voltage differential signaling) deserializers 702 for receiving and deserializing digital image data from the controller or PC; a number of field-programmable gate arrays (FPGAs 704) for decoding and error checking received data, and for writing data to pixel data registers; a number of digital to analog converters (DAC 706) for converting pixel data to analog signals to drive the LDSLM; and one LDSLM 708 which is comprised of a number of the blocks of cells 710 to modulate the light incident thereon.

Figure 8:
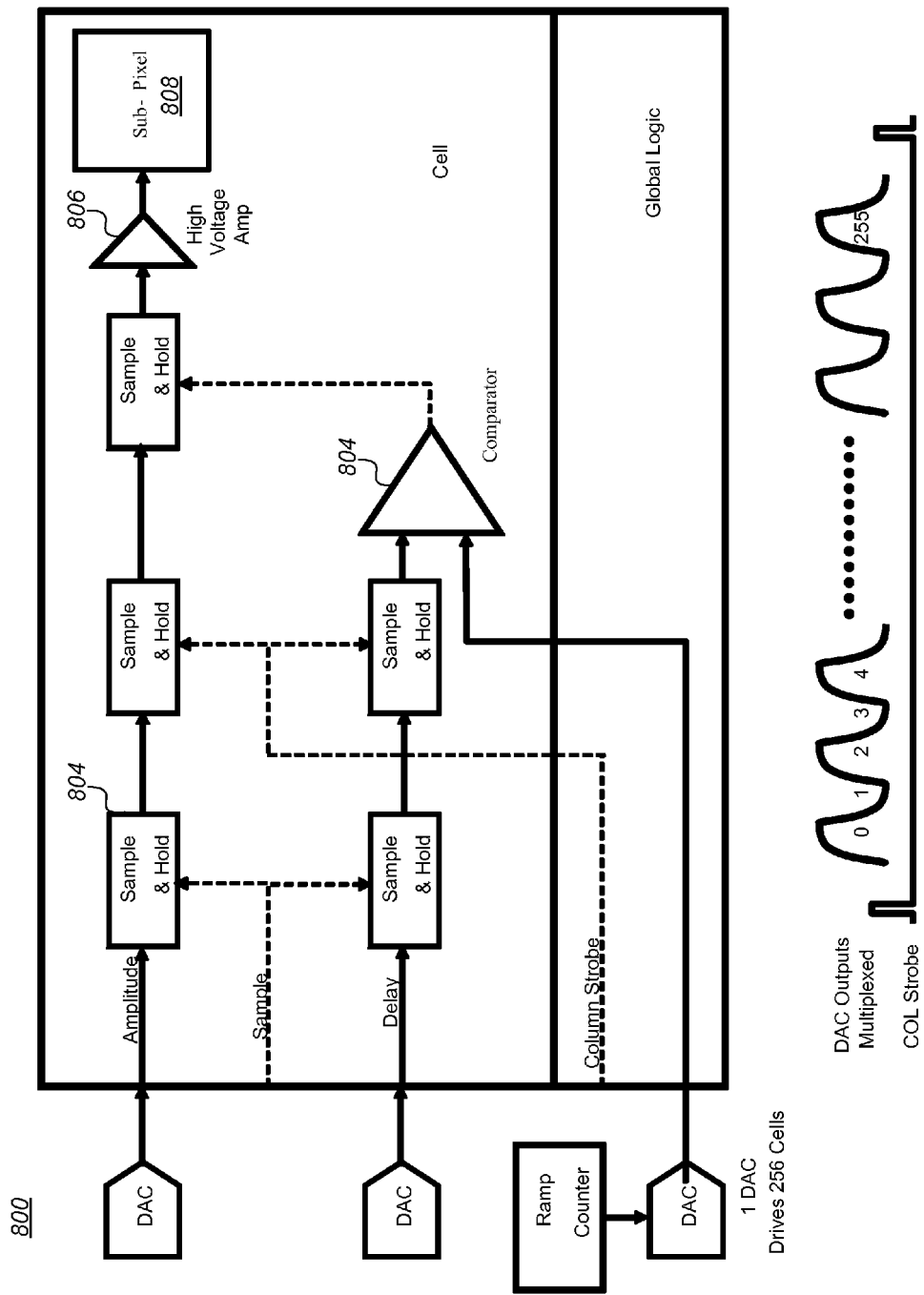
FIG. 8 is a schematic block diagram of an of a cell architecture according to an embodiment of the present disclosure.

FIG. 8 is a schematic block diagram of an of a cell architecture according to an embodiment of the present disclosure.

Referring to FIG. 8, the cell 800 includes a number of sample and hold circuits 802 to sample hold signals (pixel data) from the FPGAs, including amplitude and delay data. The cell 800 further includes a comparator 804 to control pulse width modulation and a high voltage amplifier 806 to drive the associated sub-pixel 808.

Figure 9:
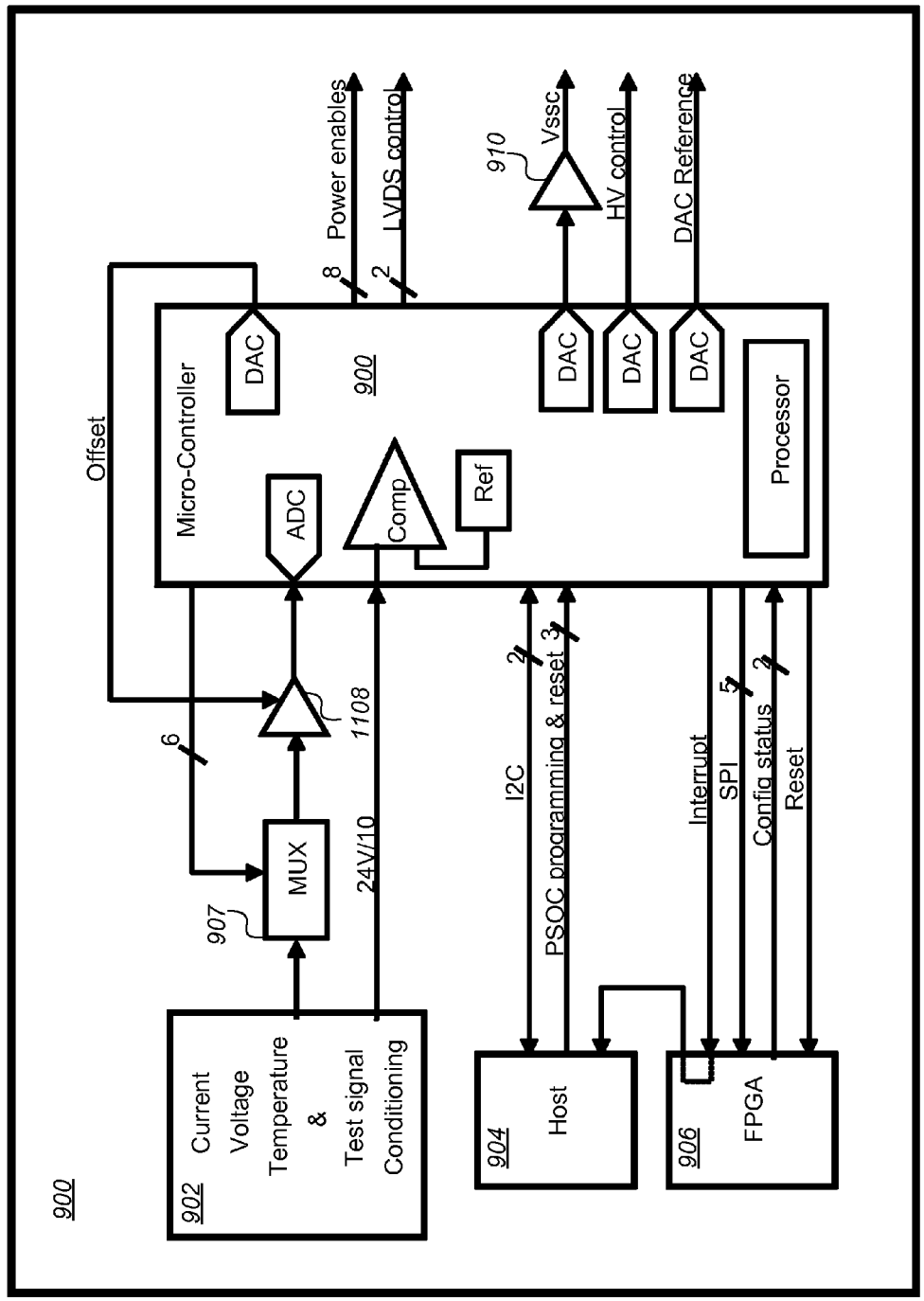
FIG. 9 is a schematic block diagram of a controller for a film recorder according to an embodiment of the present disclosure.

FIG. 9 is a schematic block diagram of a controller for a GLV module according to an embodiment of the present disclosure. The controller shown in FIG. 9 is responsible for powering up and powering down the module and for providing heath monitoring functions. Referring to FIG. 9, the controller 900 generally includes in addition to a conditioning circuit 902, host interface 904, one or more multiplexers (MUX 907) and amplifiers 908 or buffers 910, a software configured, mixed-signal micro-controller 912. The micro-controller 912 can include in addition to configurable memories, logic blocks and functions, a processor, a comparator, a voltage or current reference, a number of ADCs, DACs, and a large number of routable General Purpose Input/Outputs (GPIOs). One suitable a micro-controller 912 is a PSoC (Programmable System-on-Chip) micro-controller made by Cypress Semiconductor, of San Jose Calif.

Figure 10A:
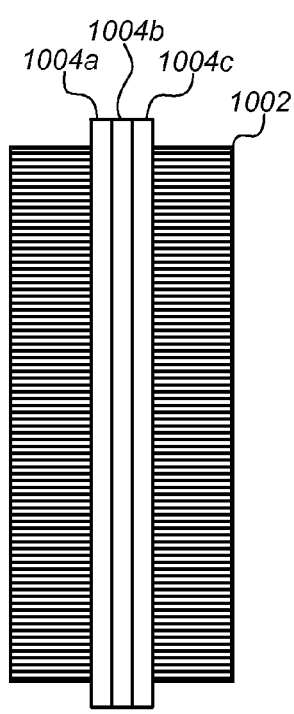
FIGS. 10A-10C are timing and optics diagrams illustrating a color-by-line writing mechanism according to an embodiment of the present disclosure.
Figure 10B:
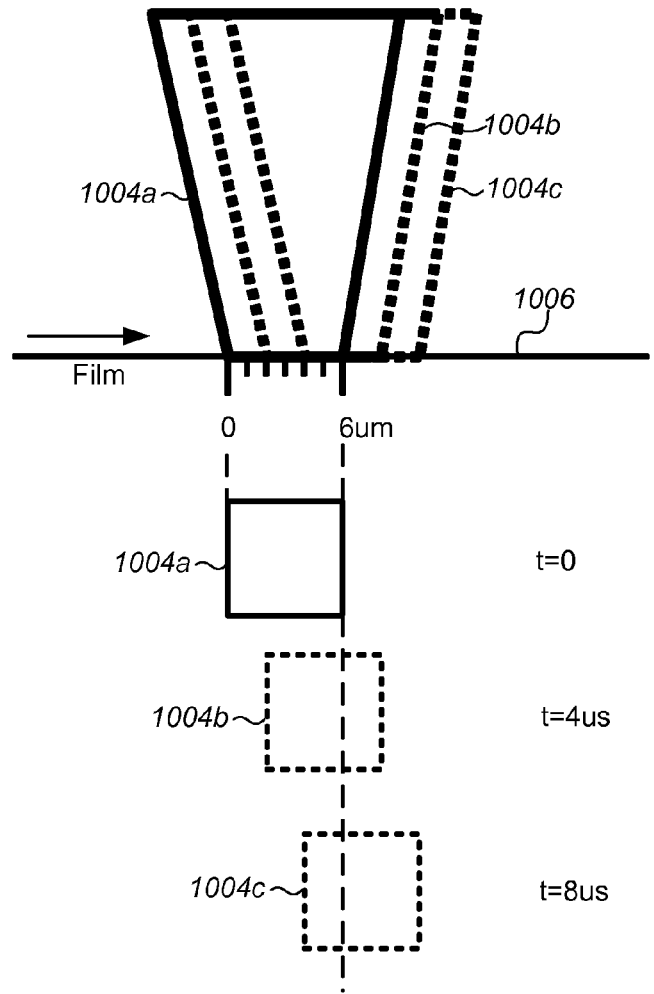
Figure 10C:
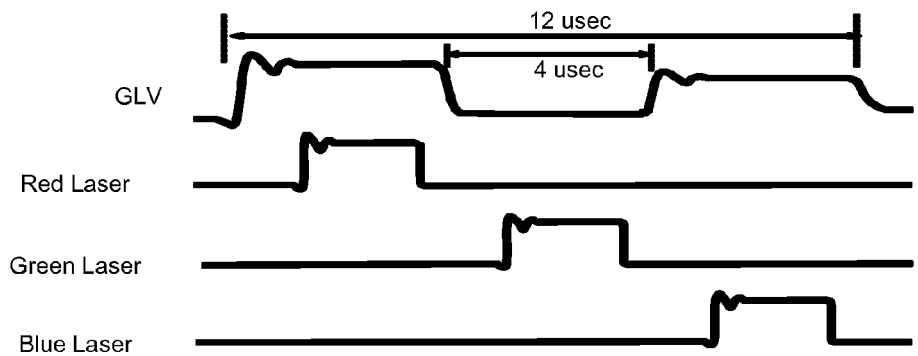

Two mechanisms and methods for recording color images will now be described. In a first embodiment color images can be recorded line-by-line using a single LDSLM and three independently operated monochromatic light sources, such as light emitting diodes (LEDs), or narrow band or coherent light sources each having a different wavelength or color. For example, in one embodiment the three independently operated monochromatic light sources can include a red laser (R), green laser (G) and blue laser (B). Referring to FIGS. 10A-C, the mechanism and method include illuminating a single LDSLM 1002 with three different wavelengths of light 1004a-c from three different light sources, for example red laser (R), green laser (G) and blue laser (B), and sequential writing a line image color content (R,G,B, R,G,B . . . ) to the LDSLM. The R, G and B laser beams are staggered or offset on LDSLM 1002 by substantially a beam-width, that is the width of a beam illuminating the LDSLM to produce an offset on the media (film 1006) by ⅓ of pixel pitch. Sequential firing of colors, i.e., operation or pulsing of the R, G and B lasers, in synchronization with transport of the film 1006 provides color convergence on the film. In the embodiment shown in FIG. 10B, a color image having a pixel width or pitch of 6 μm is recorded on a linear portion of photographic film 1006 moving in either a stepped or continuous motion in the direction indicated at a rate of 2 μm per 4 microseconds (μs). In a first time period beginning at time t=0 light 1004a from a red laser is modulated by the LDSLM 1002 and exposes a line of pixels with a width or pitch on the surface of the film 1006 of 6 μm. In a second time period beginning at time t=4 μs the film 1006, which has advanced 2 μm, is exposed by modulated light 1004b from a green laser. In a third time period beginning at time t=8 μs the film 1006, which has again advanced 2 μm, is exposed by modulated light 1004c from a blue laser. Referring to FIG. 10C, it is seen that the lasers are pulsed for a time or pulse width of 2 to 3 μs after the GLV ribbons of the LDSLM have been repositioned to appropriately modulate the associated color light and have stabilized.

In a second embodiment color images can be recorded frame-by-frame using a single LDSLM and three independently operated monochromatic light sources, each having a different wavelength or color, for example red laser (R), green laser (G) and blue laser (B). The different colors are recorded by frame-by-frame by repeatedly exposing a single frame of the film while changing colors between exposures. It will be appreciated that color frame-by-frame is a slower process since the transport must reverse direction to re-expose the frame with the $2^{nd}$ and $3^{rd}$ colors. The color line-by-line is faster since the transport may run continuously at constant velocity in a single direction, 1 frame cycle, but requires fast pulsing of the lasers.

Figure 11:
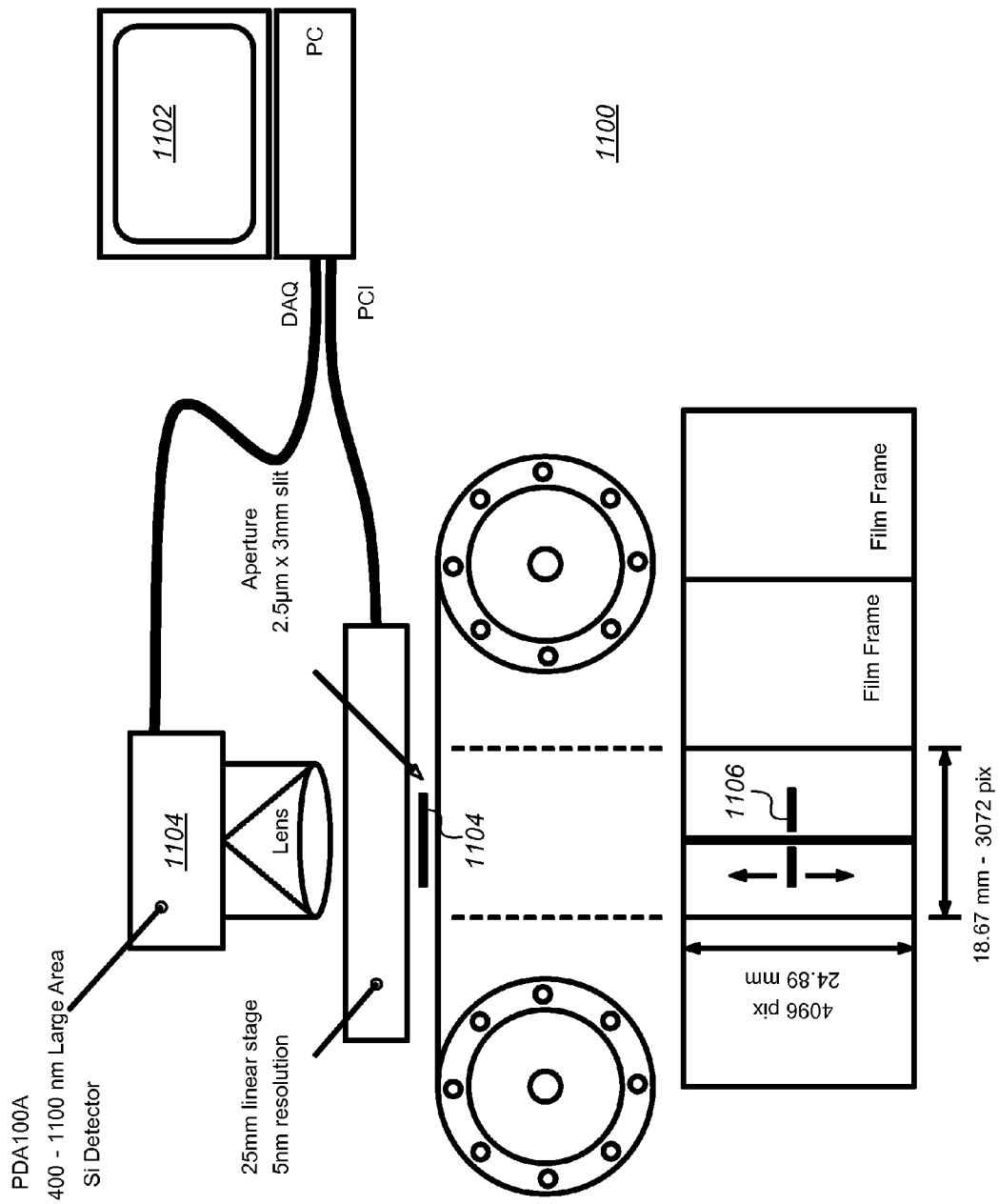
FIG. 11 is a schematic block diagram of a calibration subsystem for use in a film recorder according to an embodiment of the present disclosure.

In an optional or preferred embodiment, shown in FIG. 11, the film recorder further includes a calibration subsystem 1100 to calibrate an intensity, contrast and/or synchronization of the modulated light to the moving film. The calibration subsystem 1100 generally includes a program running on the host or a dedicated PC 1102 and a photo-detector (PD 1104). The PD attaches to imaging plane after removing the film transport or tool (same as current calibration), can be permanently mounted below the imaging plane and exposed through a scanned slit 1106 or aperture therein when the film is removed. In one exemplary embodiment, the aperture comprises a number of 2.5 µm slits to provide about ⅓ pixel spatial resolution. The stage provides ¹⁄₁₀₀₀ pixel stepping resolution.

Figure 12:
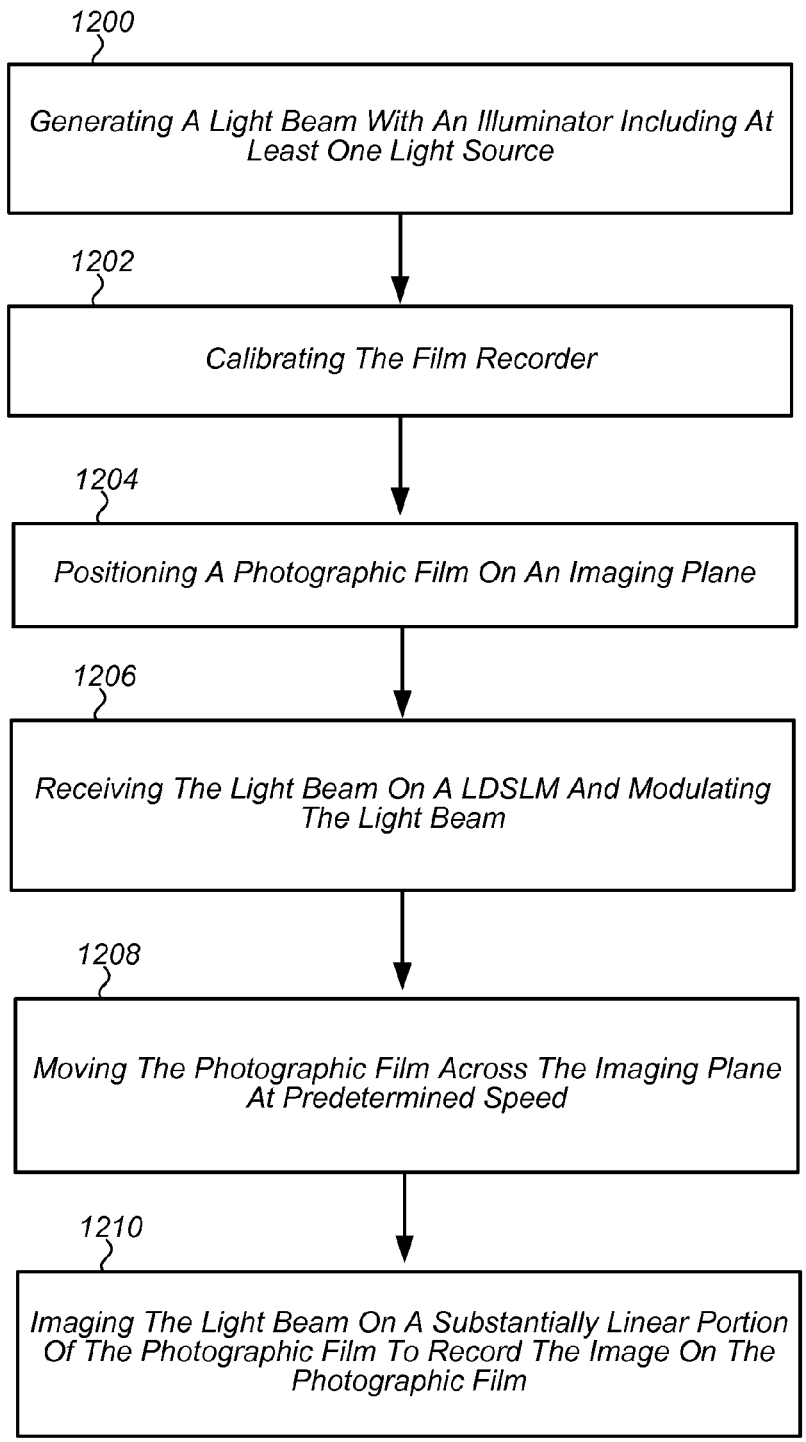
FIG. 12 is a flow chart of a method of recording a digital image on a strip of photographic film according to an embodiment of the present disclosure.

FIG. 12 is a flow chart of a method of recording a digital image on a strip of photographic film according to an embodiment of the present disclosure. Briefly, in one embodiment the method involves or includes: generating a light beam with an illuminator including at least one light source (block 1200); calibrating the film recorder (block 1202) using a photo-detector on an imaging plane; loading or positioning the photographic film on the imaging plane (block 1204); receiving the light beam on a linear diffractive spatial light modulator (LDSLM) and modulating the light beam (block 1206); moving the photographic film across the imaging plane at predetermined speed using a film transport (block 1208); and imaging the modulated light beam on a substantially linear portion of the photographic film with imaging optics disposed in a light path between the LDSLM and the imaging plane to record the image on the photographic film (block 1210).

Generally, as described above, the LDSLM includes a plurality of deformable ribbons each having a light reflective planar surface, and modulating the light beam, block 1206, is accomplished by deforming or deflecting some of the plurality of deformable ribbons so that light reflected therefrom constructively or destructively interferes with light reflected from other static ribbons or a reflective surface of the underlying substrate.

Optionally, where the illuminator includes a plurality of monochromatic light sources of different colors each independently controlled by a light source controller, the step of imaging the modulated light beam on a substantially linear portion of the photographic film, block 1210, can include offsetting modulated light beams from one another on the LDSLM by a beam width and on the imaging plane by one third (⅓) of a pixel pitch, and the method further includes operating or pulsing the plurality of monochromatic light sources in synchronization with transport of the photographic film across the imaging plane to record a color image on the photographic film line by line. Alternatively, the film recorder can further include a plurality of LDSLMs, each receiving a different colors from the illuminator, and the step of imaging the modulated light beam on a substantially linear portion of the photographic film, block 1210, can include combining the modulated light beams of different colors using a color combiner to record a color image on the photographic film.

In summary, the advantages of the film recorder and method of the present invention over previous or conventional recorders and methods include frame rates from about 20 to about 200 frames-per-second (FPS), with from about 2 k to about 8 k pixels-per-line at an amplitude resolution of 10 to 16 bits-per-color or greater. In particular, early testing of certain embodiments of a film recorder using a LDSLM has yielded 4 k image resolution at speeds of up to 24 FPS and 2 k image resolution at speeds up to 48 FPS.

In the preceding description, for purposes of explanation, numerous specific details have been set forth in order to provide a thorough understanding of the fabrication method of the present disclosure. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the diffractive MEMS. The appearances of the phrase "one embodiment" in various places in the specification do not necessarily all refer to the same embodiment. The term "to couple" as used herein may include both to directly connect and to indirectly connect through one or more intervening components.

The foregoing description of specific embodiments and examples have been presented for the purpose of illustration and description, and although described and illustrated by certain of the preceding examples, the number and configuration of LDSLMs in the film recorder disclosed herein are not to be construed as being limited thereby. They are not intended to be exhaustive or to limit the film recorder and method to the precise forms disclosed, and many modifications, improvements and variations within the scope of the disclosure are possible in light of the above teaching.

What is claimed is:

1. A film recorder comprising:
an illuminator including at least one monochromatic light source generating a light beam;
a spatial light modulator assembly including at least one linear diffractive spatial light modulator (LDSLM) to receive the light beam from the illuminator and modulate the light beam from the illuminator;
a film transport for transporting a photographic film on an imaging plane;
imaging optics disposed in a light path between the LDSLM and the imaging plane to image the light beam simultaneously on a substantially linear portion of the photographic film to record an image on the photographic film; and
a calibration subsystem including a photo-detector exposed on the imaging plane when the photographic film is not present.

2. A film recorder according to claim 1, wherein the illuminator includes a plurality of monochromatic light sources, each of a different wavelength, and the wherein LDSLM is programmable to modulate each of the different wavelengths from fully reflected to fully extinguished.

3. A film recorder according to claim 2, wherein the LDSLM is configured to modulate the light beam to provide at least 10 bit amplitude resolution from fully reflected to fully extinguished.

4. A film recorder according to claim 2, wherein the plurality of monochromatic light sources include a red, green and blue light sources offset from one another on the LDSLM, and wherein red, green and blue light beams are offset from one another on the imaging plane by one third (⅓) of a pixel pitch.

5. A film recorder according to claim 4, further comprising a controller to pulse each of the red, green and blue light sources in synchronization with transport of the photographic film at predetermined speed across the imaging plane to record a color image on the photographic film line by line.

6. A film recorder according to claim 1, wherein the LDSLM comprises a linear array of a plurality of deformable ribbons each having a light reflective planar surface, the plurality of deformable ribbons grouped to form a number of pixels.

7. A film recorder according to claim 6, wherein the LDSLM further comprises a substrate having a reflective surface over which the plurality of deformable ribbons are positioned, and wherein the plurality of deformable ribbons are spaced apart and each of the number of pixels comprise at least one of the plurality of deformable ribbons and a portion of the reflective surface of the substrate.

8. A film recorder according to claim 1, further comprising illumination optics including a beam profiler to expand the light beam from the illuminator and a collimating lens to receive the expanded light from the beam profiler and direct the beam to LDSLM.

9. A film recorder according to claim 8, wherein the beam profiler and collimating lens are arranged so the expanded beam received in the collimating lens is off-axis from a center thereof, and the collimating lens imparts a specific angle ($\Theta$), to the light beam exiting the collimating lens.

10. A film recorder according to claim 9, wherein angle ($\Theta$) is angle is chosen to match a diffraction angle of the LDSLM, and diffracted 1st order light exits the LDSLM normally, along an optical axis thereof.

11. A method for recording a digital image on a strip of photographic film, comprising:
    positioning a calibration subsystem including a photo-detector on an imaging plane when the photographic film is not present;
    positioning the photographic film on the imaging plane;
    emitting a light beam from an illuminator including at least one light source;
    focusing the light beam onto a spatial light modulator assembly including at least one linear diffractive spatial light modulator (LDSLM) comprising a plurality of deformable ribbons each having a light reflective planar surface; and
    modulating light received on the LDSLM, and imaging the modulated light beam on a substantially linear portion of the photographic film with imaging optics disposed in a light path between the LDSLM and the image plane to record the image on the photographic film.

12. A method according to claim 11, wherein the illuminator comprises a plurality of monochromatic light sources of different colors each independently controlled by a light source controller, and wherein modulated light beams from each of the plurality of monochromatic light sources are offset from one another on the imaging plane by one third ($\frac{1}{3}$) of a pixel pitch.

13. A method according to claim 11, wherein the plurality of monochromatic light sources are pulsed in synchronization with transport of the photographic film at predetermined speed across the imaging plane to record a color image on the photographic film line by line.

14. A method according to claim 11, wherein the illuminator comprises a plurality of monochromatic light sources of different colors and the spatial light modulator assembly includes a plurality of LDSLMs, and wherein focusing the light beam onto a LDSLM comprises focusing light from each of the plurality of monochromatic light sources onto a separate one of the plurality of LDSLMs, and imaging the modulated light beam on a substantially linear portion of the photographic film comprises combining the modulated light beams of different colors to record a color image on the photographic film.

15. A method according to claim 11, further comprising expanding the light beam from the illuminator and directing the expanded light beam to the LDSLM using a collimating lens wherein the collimating lens is arranged so the expanded beam received in the collimating lens is off-axis from a center thereof, and the collimating lens imparts a specific angle ($\Theta$), to the light beam exiting the collimating lens.

\* \* \* \* \*